May 5, 1970

G. SCHRADER 3,509,722

MASTER CYLINDER

Filed May 22, 1968

INVENTOR.
GERT SCHRADER
BY Karl F. Ross

ATTORNEY

May 5, 1970  G. SCHRADER  3,509,722
MASTER CYLINDER

Filed May 22, 1968  2 Sheets-Sheet 2

INVENTOR.
GERT SCHRADER
BY Karl F. Ross
ATTORNEY

United States Patent Office 3,509,722
Patented May 5, 1970

3,509,722
MASTER CYLINDER
Gert Schrader, Walldorf, Germany, assignor to Alfred
Teves G.m.b.H., Frankfurt am Main, Germany, a corporation of Germany
Filed May 22, 1968, Ser. No. 731,055
Claims priority, application Germany, May 23, 1967,
T 33,954
Int. Cl. F15b 7/08
U.S. Cl. 60—54.6                                6 Claims

ABSTRACT OF THE DISCLOSURE

The piston of an automotive master brake cylinder is progressively rotated about its longitudinal axis. The intermittent rotation, occurring during each stroke, is designed to eliminate premature furrowing of the primary sealing cup of the piston at that part of its circumference which repeatedly passes over an unsmooth portion of the cylinder wall, e.g., a wall having one or more openings for the intake of brake fluid. Through the rotation the entire periphery of the primary cup is uniformly exposed to the unevenness in the wall.

---

My present invention relates to a master cylinder piston arrangement for an automotive brake system and, more particularly, to a piston reciprocatingly slidable in a cylinder having at least one radial bore under the influence of a force-transmitting member and a restoring force acting in opposite directions.

Conventionally, the master cylinder is formed with a drilled inlet port connecting the working chamber of the cylinder with the hydraulic fluid reservoir. The piston movable in the cylinder is provided at its free end with a forwardly concave seal, commonly referred to as the primary sealing cup, made from an elastomeric substance and designed to seal the piston in all-around contact with the cylinder interior. When, in the course of normal operation, the piston and its primary cup pass along the interior cylinder wall, a very limited area on the circumference of the primary sealing cup is apt to be furrowed by rubbing aginst unsmooth surfaces formed at the inlet opening in the wall. The deterioration of the elastomeric material in one spot may be severe enough to require frequent replacement of an otherwise still serviceable cup.

To avoid this one-sided wear it has been proposed earlier to rotate the cup relative to the piston on which it is mounted, so that the grooving is distributed evenly over the entire cup circumference. The drawback of this suggestion is that considerable force must be applied to turn the cup against the adhesive force holding it on the piston.

It is therefore the principal object of my invention to obviate the disadvantages of earlier systems and to provide reliable and economic means for the uniform wear of the primary cup attached to a piston axially slidable in a cylinder having at least one radial bore.

Another object is to provide simple means for equalizing wear of a primary sealing cup which can be incorporated into conventional brake systems.

These objects and others which will become apparent hereinafter are attained, in accordance with the present invention, by imparting on the forward or return strokes a torque to the piston itself, causing it to rotate together with the primary cup mounted thereon. Thus, in the course of a number of braking operations the piston can turn through a full circle, thereby distributing the wear symmetrically over the entire periphery of the cup surface. In the preferred embodiment the rotational force is generated by the linear or axial force which the piston receives through an actuating rod. A structurally simple mechanism generating the rotational force is located near the open end of the cylinder and can comprise two juxtaposed disks engageable with one another on the return stroke of the piston under the axial force of the restoring spring. One of the disks, received in a recess in the piston shoulder and provided with a sawtooth-edged rim, is engaged by tongues protruding along chords at an angle from the opposing disk when the two disks are proximate to one another. The relative attitude of the tongues and the serrations in which they are received creates a slight twisting motion which is applied to the piston and results in a stepwise 360° rotation about its longitudinal axis.

In another version of my invention the torque-producing mechanism comprises a screw disposed in the force-transmitting rod at the end which bears against the piston. In the interior of the rod, the screw is received in a threaded bore. Actuation of the rod during the intake stroke generates a reaction force which, after overcoming a predetermined play between the piston and the head of the screw, presses these elements together. The screw, having a coarsely threaded (steep-pitch) shank, produces, on axial compression, an angular movement which in turn is communicated to the piston with which the screw is in frictional contact.

According to another variation of my invention, the element which is rotatable with respect to the rod is formed as a sleeve surrounding part of the end thereof. A helical spring is fixedly attached at one end to a point inside a longitudinal bore in the rod. The other end of the spring is fastened to the interior of the sleeve which faces the bore. The helical spring adds a rotational component to the force-pressing piston and sleeve together. A predetermined play between the rod and the sleeve is maintained by means of a stop attached to the interior of the sleeve.

In yet another version of my invention I provide diametrically opposed grooves inside a sleeve surrounding the free end of an actuating rod. The grooves, formed in a generally oblique direction relative to the longitudinal axis of the rod, are engageable by a bolt led through a central bore of the rod and attached thereto. Here the engagement of the bolt generates the twisting of the piston. In this embodiment the brake play is sustained by a spring interposed between the end of the rod and the interior face of the sleeve.

Thus the basic structure of the present invention comprises, in addition to the cylinder housing containing an axially extending cylinder bore with an uneven portion (e.g., an intake or outlet port formed radially in the wall of this bore), an axially reciprocable piston, one end of which forms a wall of the working chamber of the cylinder and is provided with an elastomeric, forwardly concave primary sealing cup nonrotatably attached to the piston and having a rim which is urged outwardly by the fluid pressure within the working chamber. A restoring spring in this working chamber bears against the piston (e.g., while being seated in the primary sealing cup) and exerts a restoring force tending to drive the piston in the rearward direction and to yieldably resist displacement of the piston in the forward direction. The actuating means of this assembly comprises an actuating rod which extends inwardly through the open end of the housing into the cylinder bore and may have a convex extremity which is swivelably received in the complementary socket at the other end of the piston, the rod being nonrotatable about the piston axis. According to an important feature of this invention, relative rotation is permitted between the convex end of the rod and the concave socket portion of the piston for restoring the motion-translating means to its initial condition after a partial angular displacement of the piston or to allow such angular displacement in the first place. Preferably, the relative rotation is permitted by maintaining a slight gap or "play" (as described above) between the forward end of the rod and the socket in which it is engaged or by providing other means for establishing rest positions of the piston (in its extreme or limiting rearward position) and the rod (in its unactuated position) to relax the frictional contact between the forward end of the rod and the rearward face of the socket.

The motion-translating means includes at least one member engageable with the rear portion of the piston upon axial displacement of the latter in one direction for angularly displacing the piston. Such means can include a pawl-and-ratchet arrangement formed, for example, by a tongue carried by one of the actuating rod or cylinder-housing members and engageable with a stepped portion of the piston forming the ratchet or, alternatively, a pawl on the piston member engageable with a ratchet on the cylinder member or the actuating-rod member. Alternatively, a friction contact can be provided between the displaceable element of the motion-translating means, this element being displaced angularly upon axial movement of the actuating rod member and frictionally entraining the piston during such angular movement. This element may form the convex portion of the rod and thus can be axially and angularly displaceable relatively thereto. Preferably, spring means is provided between the rod and this element for restoring the same to its original angular position upon relaxation of the frictional contact between the rod head and the socket.

The above and other objects, features and advantages of my invention will become more readily apparent from the following description, reference being made to the accompanying drawing in which.

Figure 1:
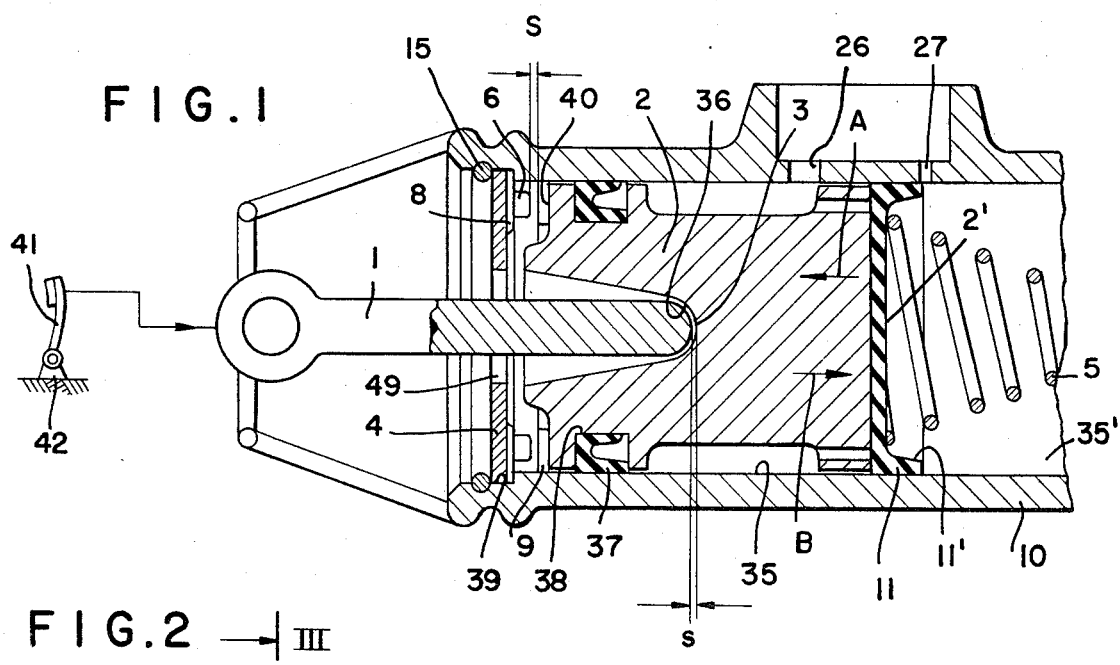
FIG. 1 is an axial cross-sectional view of part of a master cylinder according to my invention.
Figure 2:
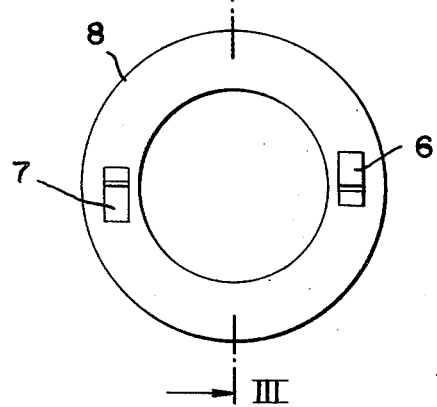
FIG. 2 is a plan view of a perforated disk with attached tongues according to my invention.
Figure 3:
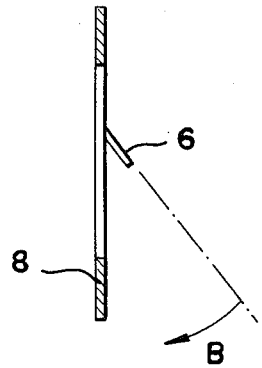
FIG. 3 is a cross-sectional view taken along the line III—III of FIG. 2.

In the drawing I show a master cylinder whose cylinder housing 10 has the usual master cylinder bore 35 connected with an intake port 26 and a bypass port 27 to a fluid reservoir (not shown) in which brake fluid is stored in the usual manner, as described and illustrated, for example, in "Principles of Automotive Vehicles," U.S. Government Printing Office, Washington, D.C., 1956, pp. 437 ff. The outlet connection of the working chamber 35' of the cylinder is connected to the wheel brakes as there described.

Within the cylinder bore 35 the forward end 2' of an axially shiftable piston 2 is provided with a primary sealing cup 11 made of an elastomeric substance and facing the restoring spring 5 in the interior of the working chamber 35' of the cylinder bore 35. The spring is prestressed to resist displacement of the piston 2 in the forward direction (arrow B). The fluid pressure in chamber 35' urges the flange 11' of the primary cup 11 outwardly against the wall of the bore 35.

At its opposite end, the piston 2 is formed with a concave socket 3 in which the complementarily formed spherical head 36 of the actuating rod 1 is received.

A gland-type seal 37 in the peripheral groove 38 of the piston 2 slidably engages the wall of the cylinder 35 to prevent leakage of hydraulic fluid therefrom and constitutes the so-called secondary cup. An annular abutment disk 4 and an adjoining ring 8 are received in an inwardly open circumferential recess 39 formed in the wall of the cylinder housing 10 in the vicinity of its open end. The disks are held in position by the spring ring 15. The rod 1, which is not rotatable, passes through an axial opening 49 in the disk 4.

Figure 5:
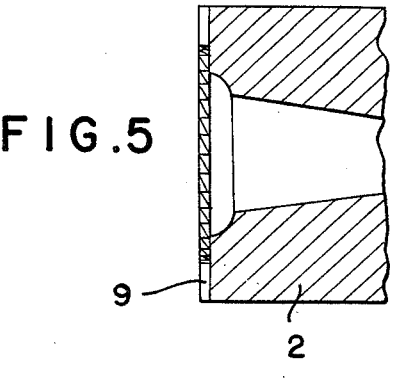
FIG. 5 is a cross-sectional view of the part shown in FIG. 4 taken along the line V—V of FIG. 4.
Figure 4:
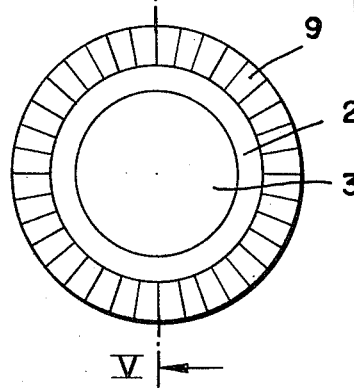
FIG. 4 is a plan view of a toothed ratchet disk according to my invention.

On the ring 8 opposite the piston shoulder 40, a pair of resilient metal tongues 6, 7 are disposed in diametrically opposed direction and parallel to one another, these tongues lying along respective chords of the disk and constituting pawls of a pawl-and-ratchet motion-translating means. The tongues extend at angles of approximately 45° to the plane of the disk. The annular shoulder 40 of the piston 2, extending laterally outwardly of the socket 3, is provided with radial serrations of substantially saw-tooth-shaped form as seen in profile in FIG. 5, the teeth forming a ratchet.

In operation, depression of the brake pedal 41, which is fulcrumed at 42 to the vehicle body, shifts the force-transmitting rod 1 forwardly in the direction of the arrow B (FIG. 1) to displace the piston 2 to the right and compress the spring 5 while forcing brake fluid into the wheel brakes. Upon release of the brake pedal, the spring 5 expands and returns the piston 2 to the left, in the direction of the arrow A, and brings the serrated surface of the shoulders 40 to bear against the protruding free ends of the tongues 6, 7. The axial compression deflects the tongues inwardly, thereby generating an angular torque at the teeth engaged by the tongues. The piston is thus rotated. The progressive rotational motion of the piston, repeated upon each piston stroke upon the brake deactuation, distributes the wear produced by the uneven cylinder wall on the primary cup over its entire circumference. In the inactive position of the rod 1, the friction contact of its head with the socket is insufficient to impede rotation.

Figure 6:
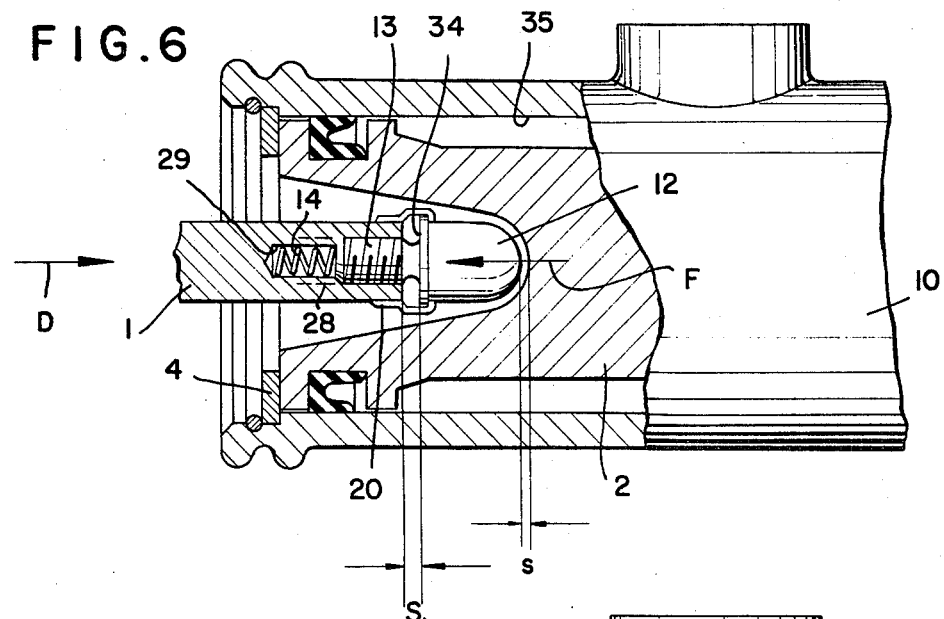
FIG. 6 is an axial cross-sectional view of part of a master cylinder showing another version of my invention.

In FIG. 6, I show, as in FIG. 1, a piston 2 actuated by a rod 1 and slidable in the cylinder bore 35. The rod here has a longitudinal axial bore 29 provided, at least through part of its interior, with a coarse or steep-pitch thread. A complementary screw 13 with a round head 12 cooperates with the thread in the bore 29 where it abuts against a compression spring 14. The opposite end of the spring 14 rests against the bottom of the bore 29. In the rest position the brake play $S_1$ between the flat end 34 of the round head 12 of the screw 13 and the rod 1 is reset by means of the prestressed spring 14. The brake play S obtains between the piston 2 and the round head 12 in the rest state.

Depression of the brake pedal 41 drives the rod 1 in the direction of the arrow D and forces the head 12 of the screw 13 into frictional contact with the piston 2 after overcoming the play S. The pressure forces the coarse-threaded screw 13 against the opposing force of the spring 14 into the coarse-threaded interior of the bore 29. The linear displacement in the direction of the arrow F corresponds to the play $S_1$ between the flat end 34 of the round head 12 and the free end of the rod 1. The rotational displacement evolving from the spiral motion of the screw 13 is transmitted frictionally through the head 12 to the piston 2 and the primary cup 11 which is attached thereto. On the return stroke of the piston 2 the spring 14 returns the screw 13 in the direction of the arrow D to the point where a stop boss 20 prevents a further advance beyond the predetermined brake play S when frictional contact is eased.

Figure 7:
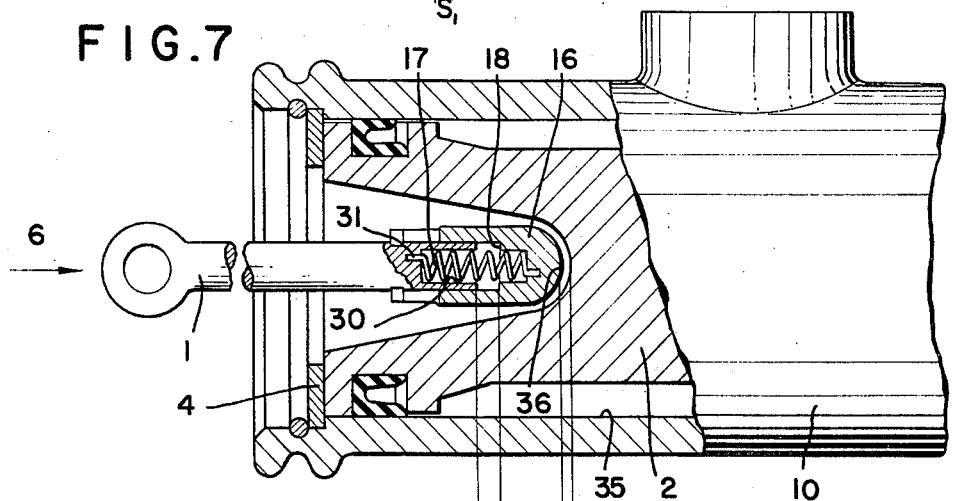
FIG. 7 is an axial cross-sectional view of part of a master cylinder showing still another version of my invention.

In FIG. 7 there is shown a helical spring 17 attached at one end to the closed end 31 of a longitudinal bore 30 inside the rod 1. The other end of the spring 17 is attached to the interior of a sleeve 16 surrounding the end part of the rod 1 and having a spherical surface conforming to the concave socket 36 of the piston 2. A stop 18 provided in the sleeve 16 maintains a predetermined play $S_2$ between the sleeve 16 and the rod 1. In the rest state the play S is maintained between the piston 2 and the sleeve 16.

Operation of the brake causes the rod 1 to be shifted in the direction of the arrow G and brings the sleeve 16, after surmounting the brake play S, into frictional contact with the piston 2. A reaction force in the opposite direction overcomes the brake play $S_2$ and generates, through compression of the helical spring 17, a rotational motion which is transmitted to the piston 2 and the attached primary cup 11 through the frictional contact between the former and the sleeve 16. On the return stroke the sleeve 16 is reset in its previous position and the brake play S between the sleeve and the piston is restored. The process repeated over a number of successive piston strokes, is adapted to distribute wear of the primary cup uniformly over the circumferential surface.

Figure 8:
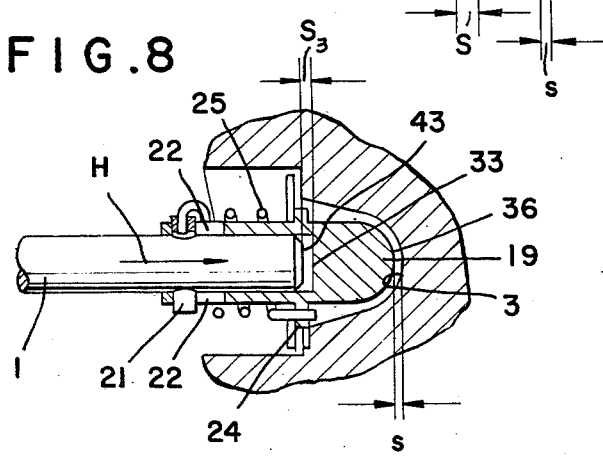
FIG. 8 is another axial cross-sectional view of part of a master cylinder according to yet a different embodiment of my invention.
Figure 9:
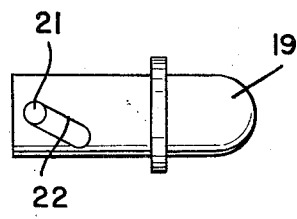
FIG. 9 is a side-elevational view of a part shown in FIG. 8.

The system shown in FIG. 8 also comprises a sleeve 19 surrounding the free end of a rod 1. The interior of the sleeve 19 is provided with two oppositely camming grooves 22. The grooves 22, shown in the enlarged view of FIG. 9, are engageable by a bolt 21 which passes through the rod 1 and is fixedly attached thereto. The longitudinal groves 22 are disposed in an oblique direction respectively to the longitudinal axis of the rod 1. A coil spring 25 surrounding the sleeve 19 and held therein between the bolt 21 and a boss 24, restores the brake play $S_3$ between the face 33 of the sleeve 19 and the end 43 of the rod 1. A play S is maintained between the spherical surface 36 of the sleeve 19 and the socket 3 of the piston 2 during the rest state.

Displacement of the rod 1 in the direction of arrow H brings the spherical surface 36 of the sleeve 19 into frictional contact with the socket 3 of the piston 2 and turns both the sleeve 19 and the piston 2 about their common longitudinal axes as the nonrotatable bolt 21 slides in the oblique grooves 22. On the return stroke the sleeve 19 is detached from its contact with the piston 2 and returned to its rest position through the expansion of the spring 25. In this way the piston 2 is progressively rotated about its longitudinal axis.

I claim:

1. A master-cylinder assembly for an automotive-brake installation, comprising:

a housing forming an axially extending master cylinder;

a master-cylinder piston axially shiftable in said cylinder and having sealing means in all around engagement therewith;

means including at least one nonrotatable rod cooperating with said piston in axially displacing said piston in a forward direction to displace fluid from a working chamber of said cylinder and in a rearward direction for admitting fluid to said working chamber; and cooperating motion-translating means effective upon displacement of said piston in one of said directions for stepping said piston angularly through a partial rotation of said piston, said sealing means including a primary sealing cup nonrotatable relatively to said piston and mounted thereon for sealing engagement with the wall of said cylinder and said means for displacing said piston including a restoring spring bearing upon said piston in said rearward direction, said motion-translating means including a head rotatably mounted on said rod and mechanism coupling said rod with said head for incrementally rotating said head relative to said rod upon axial displacement of said rod.

2. An assembly as defined in claim 1, further comprising spring means connecting said rod and said head for angularly restoring said head to a rest position upon frictional disengagement of said head from said piston.

3. An assembly as defined in claim 2 wherein said spring means is a torsion spring angularly displacing said head upon axial advance of said rod relatively to said head in said forward direction.

4. A master-cylinder assembly for an automotive-brake installation, comprising:

a housing forming an axially extending master cylinder;

a master-cylinder piston axially shiftable in said cylinder and having sealing means in all around engagement therewith;

means including at least one nonrotatable rod member cooperating with said piston in axially displacing said piston in a forward direction to displace fluid from a working chamber of said cylinder and in a rearward direction for admitting fluid to said working chamber; and cooperating motion-translating means effective upon displacement of said piston in one of said directions for stepping said piston angularly through a partial rotation of said piston, said sealing means including a primary sealing cup non-rotatable relatively to said piston and mounted thereon for sealing engagement with the wall of said cylinder and said means for displacing said piston including a restoring spring bearing upon said piston in said rearward direction, said motion-translating means including an angularly displaceable head member carried by said rod member and frictionally engageable with said piston, said head member being angularly rotated upon its engagement with said piston on advance of said rod member in said forward direction, spring means connecting said rod member and said head member for angularly restoring said head member to a rest position upon frictional disengagement of said head member from said piston, and cam means connecting said rod member and said head member and independent of said spring means for positive angular displacement of said head member on relative axial displacement of said rod and said head members, said cam means including a pair of inclined-plane camming elements on said rod and said head members, respectively.

5. An assembly as defined in claim 4 wherein said camming elements include a coarse-pitch male thread on one of said members and a female thread on the other member interconnecting said head and said rod members.

6. An assembly as defined in claim 4 wherein said camming elements include an inclined slot formed in said head member and a radial pin mounted on said rod member and slidably received in said slot.

References Cited

UNITED STATES PATENTS

| 2,197,125 | 4/1940 | Cox | 60—54.6 |
| 2,211,403 | 8/1940 | Boldt et al. | 60—54.6 |
| 3,174,286 | 3/1965 | Erickson | 60—54.6 |

MARTIN P. SCHWADRON, Primary Examiner

R. R. BUNEVICH, Assistant Examiner

U.S. Cl. X.R.

74—22